United States Patent [19]
Fitzgerald et al.

[11] Patent Number: 5,802,698
[45] Date of Patent: Sep. 8, 1998

[54] METHOD OF MOVING A ROTARY FIXTURE

[75] Inventors: Brian E. Fitzgerald, Elma; Donald F. Lienert, Williamsville; Ronald J. Pascucci, West Seneca, all of N.Y.

[73] Assignee: Moog Inc., East Aurora, N.Y.

[21] Appl. No.: 66,331

[22] Filed: May 24, 1993

Related U.S. Application Data

[63] Continuation of Ser. No. 917,833, Jul. 21, 1992, abandoned.

[51] Int. Cl.⁶ .................. B23D 7/08; B23Q 7/00
[52] U.S. Cl. .................. 29/559; 269/71; 408/89; 409/198; 409/221
[58] Field of Search .................. 74/67, 96; 408/1 R, 408/89; 409/90, 197, 198, 221, 131; 269/71, 73

[56] References Cited

U.S. PATENT DOCUMENTS

| | | | |
|---|---|---|---|
| 4,529,342 | 7/1985 | Babel | 409/221 X |
| 4,713,873 | 12/1987 | Gold et al. | 29/559 |
| 4,991,463 | 2/1991 | Kawata | 74/817 |

*Primary Examiner*—Joseph M. Gorski
*Attorney, Agent, or Firm*—Phillips, Lytle, Hitchcock, Blaine & Huber LLP

[57] ABSTRACT

An improved method of moving a rotary fixture (20) from a first angular position to a second angular position includes the steps of: providing a body (25); mounting the fixture on the body for rotational movement about an axis (x—x); mounting a pin (23) in the spindle (22) of a machine tool; moving the pin so as to engage the fixture at a location eccentric to the axis; and selectively moving the pin relative to the axis from one location to another; thereby to rotate the fixture from the first angular position to the second angular position.

6 Claims, 1 Drawing Sheet

METHOD OF MOVING A ROTARY FIXTURE

This is a continuation of application Ser. No. 07/917,833 filed on Jul. 21, 1992 and now abandoned.

TECHNICAL FIELD

The present invention relates generally to the field of machine tools, and, more particularly, to an improved workpiece-holding device that may be mounted on the work table of the machine tool, and used to selectively articulate the workpiece from one angular position to another.

1. Background Art

Machine tools exist in many different forms. Some of these include lathes, milling machines, drill presses, and the like. Some of these are manually controlled, while others are automatically or numerically controlled.

In general, such machine tools of the milling- or drilling-type will typically have a movable work table, which is used to permit the workpiece to be articulated from one position to another. Depending upon the nature of the operation being performed on the workpiece, it may be necessary to rotate the workpiece about an axis. At the same time, it would be highly desirable, when such mechanism is used in connection with a numerically controlled machine tool, to include the rotation as a programmed sequence of the machine tool.

Thus, numerically controlled (NC) milling and drilling machine tools must be equipped with one or more controllable rotary axis work holding tables, in addition to the basic three orthogonal axes along which the work piece may be moved, in order to cut compound angle surfaces or holes. A first independently-controllable rotary table can be provided with a servo drive in a relatively straight-forward manner. However, a second rotary fixture, mounted on the first, presents an awkward problem of providing electrical connections which must accommodate the first angular motion. Furthermore, the need for such a second rotating axis is infrequent and the cost of an additional servo-controlled axis may be hard to justify.

The present invention overcomes both of these problems by utilizing the basic 3-axis motions of the machine in a novel way to provide the angular drive and positioning accuracy required without the attendant wiring and cost of a dedicated servo drive.

2. Prior Art

Others (e.g., Kawata, U.S. Pat. Nos. 4,991,463 and 4,884,474) have described a mechanism to cause the incremental rotation of an indexing rotary work holder by means of rectilinear motion of a (non-cutting) tool in the machine spindle relative to the housing of the rotary table. This is accomplished by means of a linear-to-rotary ratcheting device associated with an unlocking an locking index mechanism which can accurately locate the rotating table at pre-set fixed angular positions. Thus the linear advancing motion of the tool first unlocks the table and then ratchets it through an approximate fixed incremental angle, so that retracting the tool can allow the table to lock precisely at the next indexed position.

DISCLOSURE OF THE INVENTION

The present invention provides an improved method of moving a rotary fixture from a first angular position to a second angular position. The improved method broadly includes the steps of: providing a body; mounting the fixture on the body for rotational movement about an axis; mounting a pin in the spindle of a machine tool; moving the pin relative to the fixture so as to selectively engage the fixture at a location eccentric to the axis; and selectively moving the pin, while so engaged with the fixture, relative to the axis from one location to another; thereby to rotate the fixture from the first angular position to the second angular position.

In one form, the fixture may have a crank arm extending away from the axis. The spindle-carried pin may be selectively inserted into a hole provided in the distal end of this crank arm, and the pin may be moved in a programmed circular arc to selectively rotate the fixture relative to the body. In another form, the pin may engage a slot provided in the crank arm, such that linear motion of the pin will produce rotational movement of the crank arm and fixture. In still another form of the invention, the pin may simply abut a rod extending outwardly from the crank arm, with linear motion of the spindle-carried pin, bearing against a suitable surface on the fixture or the workpiece, to produce angular motion of the crank arm and fixture about the axis.

Accordingly, the general object of this invention is to provide an improved method of using a spindle-carried pin to selectively move a rotary fixture from a first angular position to a second angular position.

Another object is to provide an improved workpiece-holding mechanism which may be moved relative to a table in any of three mutually-perpendicular orthogonal linear directions, and/or rotationally about two perpendicular axes, wherein the last rotational motion is accomplished without an independent, dedicated servodrive mechanism.

These and other objects and advantages will become apparent from the foregoing and ongoing written specification, the drawings, and the appended claims.

DESCRIPTION OF THE PREFERRED EMBODIMENT(S)

Figure 1:
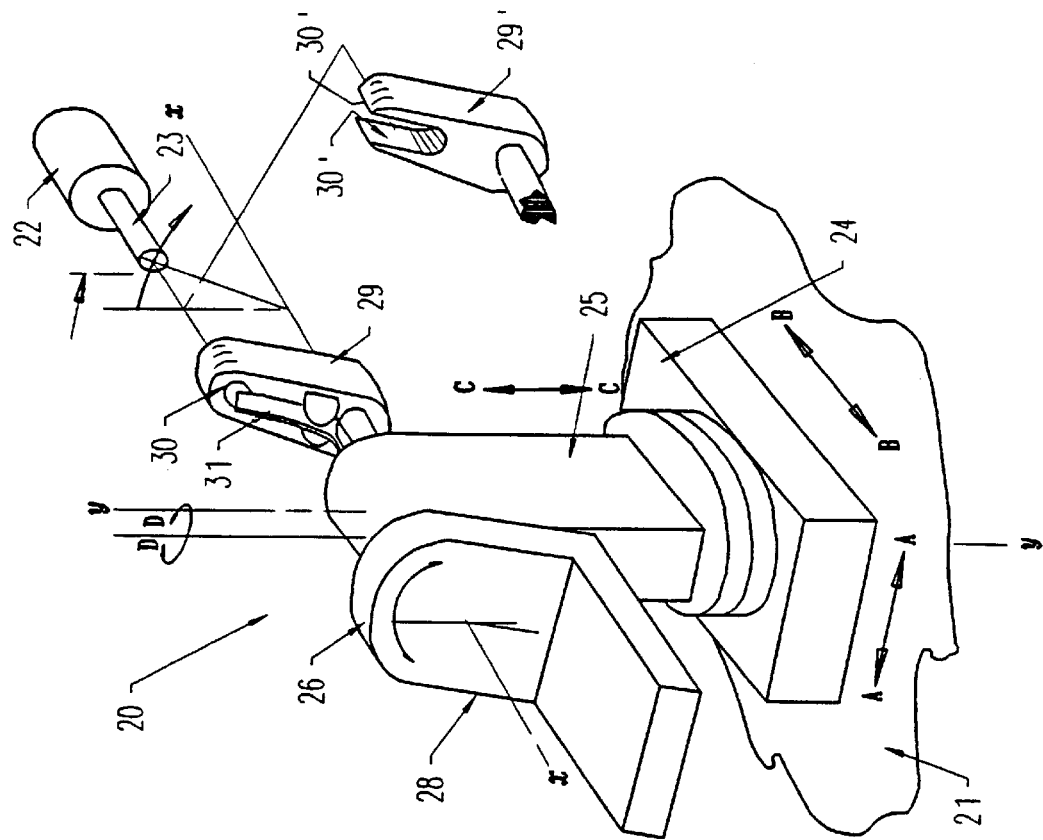
FIG. 1 is a perspective view of the improved mechanism, showing the rotary fixture as being mounted on the body, and further showing the spindle-carried pin as being in aligned relation with the crank arm, and also showing an alternative crank arm having a slot arranged to cause linear movement of the pin to produce rotational movement of the workpiece.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly"

generally refer to the orientation of a surface relative to its axis of elongation, or axis of rotation, as appropriate.

Turning now to the drawings, and, more particularly, to FIG. 1 thereof, the present invention provides an improved device or mechanism, of which a first preferred form is generally indicated at 20, which is adapted to be selectively mounted on the work table, fragmentarily illustrated at 21, of a numerically controlled machine tool (not shown). This work table is depicted as being movable in any of three mutually-perpendicular orthogonal directions, generally indicated by directional arrows A—A, B—B and C—C, respectively, relative to a spindle, of which a fragmentary portion is indicated at 22. This spindle is adapted to receive and hold a marginal end portion of a cylindrical pin, the opposite projecting portion of which is generally indicated at 23.

Mechanism 20 is depicted as having a solid rectangular base 24. A body, generally indicated at 25 is depicted as being mounted on base 24 for rotational movement about a vertical axis y—y. This rotational movement is indicated by the direction of arrows D—D.

The mechanism includes a fixture, generally indicated at 26, which is mounted on the body for rotational movement about a horizontal axis x—x which nominally intersects vertical axis y—y. In FIG. 1, the fixture is shown as having a forward part 28 and a rearward crank arm 29. These two parts 28 and 29 are connected by a horizontal shaft (not shown).

The crank arm 29 is shown as being in the form of a leg having a lower marginal end portion surrounding axis x—x, and having an upper marginal end portion surrounding horizontal through-hole 30. A locking mechanism (not shown), is located within body 25 around the horizontal shaft. Thus, this clamp-like mechanism acts as a brake to frictionally engage and hold the fixture in any angular position relative to the body. More particularly, this locking mechanism is shown as including a dogleg-shaped intermediately-pivoted lever 31 mounted on the crank arm. The upper marginal end portion of lever 31 is aligned with crank arm hole 30, and is arranged to be selectively engaged by the distal end face of pin 23, when pin 23 is selectively inserted into hole 30. The other marginal end portion of lever 31 is arranged to release the locking mechanism.

In this first form, table 21 may be selectively operated so as to move the mechanism in any of the three mutually-perpendicular orthogonal directions indicated A—A, B—B and/or C—C, respectively. By the same token, the body may be selectively rotated about fourth axis y—y by suitable means, such as an electric servomotor. The present mechanism, however, pertains to the means or mechanism for rotating the fixture about a horizontal fifth axis x—x. In this regard, the machine tool spindle 22 is positioned to insert the distal end of pin 23 into crank arm hole 30. When pin 23 is inserted into hole 30, it will engage lever 31, and disengage the locking mechanism, thereby allowing the fixture to rotate relative to the body. The pin is then moved through a circular arc about axis x—x to move the fixture from the first angular position to a second angular position. Thereafter, the pin is withdrawn from hole 30. When this occurs, the locking mechanism reengages to tightly and securely hold the fixture in the new angular position relative to the body. Thus, in this first embodiment, pin 23 is adapted to move circularly around axis x—x. This may be programmed into the A—A and C—C machine positioning axes. Thus, the axial position of pin 23 relative to fixture hole 30 is used to selectively lock and unlock the clamping hole.

FIG. 1 depicts an alternative form of the crank arm, generally indicated at 29', which is provided with a slot bounded by facing parallel side wall surfaces 30',30'. Thus, pin 23 is adapted to be selectively received in this slot. Linear motion of pin 23 will produce corresponding rotational movement of fixture 26 about axis x—x. In other forms, the fluid pressure of a coolant flow discharge may be used to selectively engage and disengage the clamping mechanism.

Figure 2:
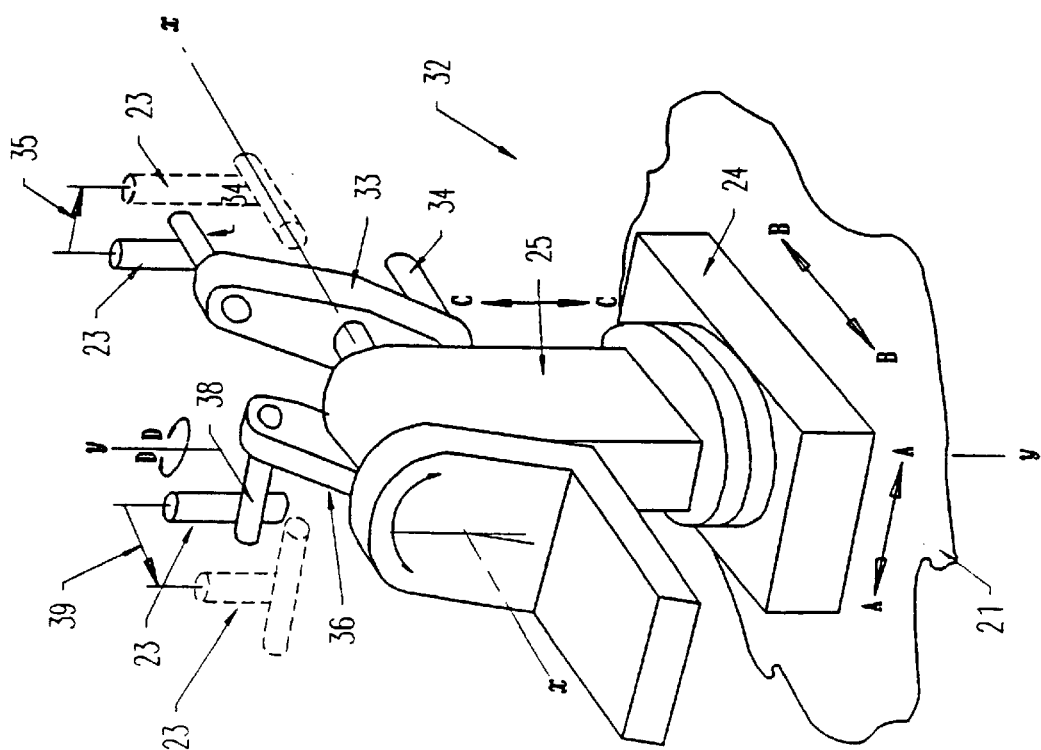
FIG. 2 is a perspective schematic view of a second form of the mechanism, this view showing a vertically-disposed spindle-carried pin as being arranged to be moved in a horizontal direction so as to produce rotational movement of the fixture relative to the body.

FIG. 2 illustrates a second form of the mechanism, generally indicated at 32. This form is also adapted to be mounted on a machine table, again indicated at 21, and further includes a base 24 and body 25, both as previously described. The forward portion of the fixture is the same as described. However, the rearward portion of the fixture is shown as having a crank arm 33 which is bisected by axis x—x. Crank arm 33 is shown as having two pins, severally indicated at 34, extending rightwardly from its upper and lower marginal end portions. In this form, the spindle-carried pin 23 is vertically-disposed, and is adapted to first engage one of pins 34. Thereafter, spindle pin 23 may be moved linearly (i.e., horizontally in the direction of arrow 35), to produce corresponding rotation of the fixture relative to the body. In this regard, the locking mechanism is provided separately. A lever 36 having its lower margin connected to the clamping mechanism, has a rod-like projection 38 extending rearwardly from its upper marginal end portion. The spindle pin, again indicated at 23, may be moved horizontally in the direction of arrow 39 to displace lever 36 to either over-center position to selectively lock or unlock the mechanism. Thus, in the second form, the spindle would typically be operated to first unlock the fixture, and then to rotate the fixture relative to the body from a first position to a second position, and then to relock the fixture in this second position. Thus, in this second form, horizontal movement of the vertically-disposed spindle-carried pin will produce angular motion of the locking lever 36 or the crank arm 33, as appropriate.

Therefore, the present invention broadly provides an improved method of moving a rotary fixture from a first angular position to a second angular position. The improved method broadly includes the sequential steps of providing a body, mounting the fixture on the body for rotational movement about an axis, mounting a pin in the spindle of a machine tool, moving the pin so as to engage the fixture at a location eccentric to the axis, and selectively moving the pin, either arcuately or linearly, relative to the main pivotal axis from one location to another, thereby to rotate the fixture from the first angular position to the second angular position.

We claim:

1. A method of using a numerically-controlled machine tool to move a rotary fixture from a first angular position to a second angular position, said machine tool having a spindle, comprising the steps of:

providing a rotary fixture;

providing a body;

mounting said fixture on said body for rotational movement about an axis;

providing a frictional locking mechanism between said body and fixture;

providing a member;

mounting said member in said spindle;

moving said spindle so as to cause said member to directly and positively engage said fixture at a location eccentric to said axis in order to hold said fixture at said first angular position;

applying pressure to said frictional locking mechanism by utilizing said member, thereby releasing said frictional locking mechanism;

operating said machine tool to selectively move said member relative to said axis while said member is engaged with said fixture to move said fixture from said first position to said second position and to hold said fixture at said second position;

relieving said pressure from said frictional locking mechanism, thereby re-engaging said frictional locking mechanism; and withdrawing said member from engagement with said fixture;

thereby to rotate said fixture about said axis from said first angular position to said second angular position.

2. The method as set forth in claim 1 wherein said fixture has a hole positioned at a location eccentric to said axis, wherein said member is a pin, and wherein said pin is adapted to be received in said hole hold when said pin is engaged with said fixture.

3. The method as set forth in claim 1 wherein a slot extends into said fixture, wherein said member is a pin, and wherein said pin is received in said slot when said pin is engaged with said fixture such that motion of said pin and spindle causes rotational movement of said fixture.

4. The method as set forth in claim 1 wherein a lug projects away from said fixture, and wherein said member selectively engages such lug such that either linear or arcuate motion of said spindle will produce rotational movement of said fixture.

5. The method as set forth in claim 1 wherein said fixture is unlocked as a function of the axial position of said lug.

6. The method as set forth in claim 1 wherein said fixture is unlocked as a function of fluid pressure.

* * * * *